United States Patent [19]

Holroyd et al.

[11] Patent Number: 5,626,806
[45] Date of Patent: May 6, 1997

[54] CARBON BLACK INCORPORATION IN POLYMERIC MATERIAL

[75] Inventors: Eric Holroyd, Knutsford; Colin Holroyd, Southport, both of United Kingdom

[73] Assignee: Holroyd Associates Limited, Wigan, United Kingdom

[21] Appl. No.: 335,815
[22] PCT Filed: May 20, 1993
[86] PCT No.: PCT/GB93/01030
§ 371 Date: Nov. 15, 1994
§ 102(e) Date: Nov. 15, 1994
[87] PCT Pub. No.: WO93/23230
PCT Pub. Date: Nov. 25, 1993

[30] Foreign Application Priority Data

May 20, 1992 [GB] United Kingdom ............ 9210720

[51] Int. Cl.$^6$ .................... B29C 47/50; B29C 47/64
[52] U.S. Cl. ............. 264/140; 264/211.23; 264/349; 366/81; 366/85; 425/204; 425/205; 425/208; 425/308
[58] Field of Search .................... 264/140, 349, 264/141, 142, 175, 211.23; 425/204, 205, 208, 308, 382.3; 366/81, 85

[56] References Cited

U.S. PATENT DOCUMENTS

| | | | |
|---|---|---|---|
| 2,319,859 | 5/1943 | Hale | 264/349 |
| 4,917,834 | 4/1990 | Hadermann et al. | 264/140 |
| 5,000,900 | 3/1991 | Baumgartner | 425/204 |
| 5,129,729 | 7/1992 | Geyer | 366/81 |
| 5,267,788 | 12/1993 | Rockstedt | 425/204 |
| 5,320,796 | 6/1994 | Harashima et al. | 264/211.23 |
| 5,348,388 | 9/1994 | Geyer | 425/208 |

FOREIGN PATENT DOCUMENTS 2068249 8/1981 United Kingdom.
2173414 10/1986 United Kingdom.

*Primary Examiner*—Mathieu D. Vargot
*Attorney, Agent, or Firm*—Young & Thompson

[57] ABSTRACT

A loose admixture of polymer pellets and carbon black primary aggregate (together with any other desired fillers) is subjected to a first shear and smear action to incorporate the filler(s) into the polymer and subsequently to additional shear and smear actions to deagglomerate and blend the mixture, all of these actions being carried out at temperatures well below the plasticizing temperature of the polymer so that smearing of the filler(s) into the polymer is facilitated. Each shear and smear assembly is made of similar hammer and anvil components comprising a milling tool acting as a hammer by rotating adjacent an array of stationary pegs acting as anvils. The end face of a milling tool presented to the pegs has oblique surfaces at the downstream ends of its channels and these smear the mixture against the confronting corners of the pegs. Two similar incorporating screws feed their product to a common deagglomerating screw and the product of this is either pelletized to make a feedstock or supplied to calendaring mills and extruders for further processing of the mixture.

12 Claims, 4 Drawing Sheets

CARBON BLACK INCORPORATION IN POLYMERIC MATERIAL

BACKGROUND OF THE INVENTION

1. Field of the Invention

This invention relates to the incorporation of carbon black, usually together with other fillers, in a polymeric material such as natural and synthetic rubber as part of the procedure of compounding.

2. Description of the Related Art

As has been known for many years, natural or synthetic rubber must be subjected to intensive working to make it softer and more pliable prior to vulcanisation. It has also been known for many years that to improve its characteristics, especially its tensile strength, and make it suitable for the manufacture of articles such as pneumatic tires, fillers must be incorporated and dispersed in the mix, the principal filler in terms of the proportion by weight utilised and the most important in terms of its effect on the characteristics of the compound being carbon black.

As manufactured particulate carbon black takes the form of groups of fused particles known as "primary aggregate". The groups are also more loosely interconnected in chains referred to as the "structure" of the filler. Successful incorporation requires that as high a proportion as possible of the voids existing between the particles of a group become filled with polymer and successful blending requires that the chains are at least to some extent broken up so as to achieve as even a dispersion as possible of the groups, or broken chains, within the body of polymer. At the same time the treatment should not be such as to destroy a high proportion of the groupings of particles, because the fusion or welds between these are believed to provide the necessary reinforcement of the compound.

Hitherto the processes of filler incorporation, blending and homogenising, and mixing or masticating have been carried out simultaneously by subjecting the heterogeneous mixture of polymer particles, carbon black and any other desired fillers to intensive working e.g. by passing it between opposed, counter-rotating rollers of a mill or by forcing it through specially shaped screws. The intensive working of the mixture generates considerable heat—typically in excess of 170 degrees centigrade—sufficient to plasticise the polymer. The perceived solution to poor incorporation or dispersion is to repeat the mixing process, the same batch of mixture being objected repeatedly to intensive working, or to extend the mixing screw so that the mixture is subjected to a lengthier mixing procedure. This of course leads to high energy consumption.

SUMMARY OF THE INVENTION

The present invention proceeds from the realisation that to plasticise the polymer is counter-productive to the aims of filler incorporation and uniform filler dispersion. According to the present invention the steps of filler incorporation and dispersion are separated from subsequent treatments of the mixture such as blending, milling or calendaring and are carried out at much lower temperatures. Consequently at least at the stage of incorporation the polymer particles remain relatively hard and their hardness is utilised in the incorporation process by causing a smearing action between the polymer particles and the filler primary aggregate. The closer the polymer particles are to their plasticising temperature the less the phenomenon of smearing will occur. This is believed to be the reason why existing mixing procedures are relatively inefficient in achieving adequate incorporation and dispersion of fillers, and why merely to repeat or to extend the mixing procedure is far from the optimum solution as well as being wasteful of energy.

A further significant benefit of carrying out incorporation of the carbon black and other fillers at temperatures well below the plasticising temperature of the polymer is both the avoidance of degradation or scorching of the polymer which can occur in conventional processes and especially avoidance of the shrinkage which occurs when a high temperature polymer preform or article is cooled. This phenomenon of shrinkage makes high quality control in conventional processes extremely difficult and since shrinkage is believed to be proportional to the temperature difference to which the polymer is subjected it is believed that the low temperature procedure will substantially eliminate it.

Moreover the relatively low energy requirement for low temperature incorporation, or low temperature incorporation and subsequent deagglomeration will, it is believed, more than offset a relatively reduced rate of production. This can be compensated by the employment of additional machines without exceeding the total energy requirement of a conventional mixing machine such as a Banbury or continuous mixer.

Accordingly the present invention provides in one of its aspects a method for the incorporation of a primary aggregate of carbon black into a polymeric material which comprises subjecting a loose, previously unworked admixture of the carbon black and pellets of the polymer to a shearing and smearing action between relatively moving hammer and anvil components such that the carbon black is incorporated into the polymer under conditions controlled so that the polymer remains throughout the incorporation procedure substantially below its plasticising temperature.

Because the polymer remains relatively hard a smearing action between it and the carbon black is facilitated. By contrast if the polymer is softened by heat the smearing action will not occur efficiently.

Preferably the method comprises producing a flow of the lightly compressed admixture past an anvil surface which is oblique to the direction of the flow and relatively moving a blunt hammer tool transversely to the direction of the flow in proximity to the anvil surface such that the admixture is smeared between the hammer tool and the anvil surface.

The method preferably comprises producing a flow of the admixture along a screw transporter and smearing the admixture between end faces of a milling tool rotating with the screw and stationary members arranged adjacent the end faces in a circumferentially spaced array around the screw shaft.

The method preferably comprises the further step of subjecting the smeared mixture to a second, deagglomerating smearing action between relatively moving hammer and anvil components under conditions controlled so that the polymer remains throughout the deagglomeration procedure substantially below its plasticising temperature.

A flow of the incorporated mixture is preferably made to pass an anvil surface which is oblique to the direction of the flow and the method preferably comprises relatively moving a blunt hammer tool transversely to the direction of the flow in proximity to the anvil surface such that the incorporated mixture is smeared between the hammer tool and the anvil surface.

The flow of the incorporated mixture is preferably at approximately half of the speed of the flow of the unincorporated admixture.

Two flows of the unincorporated admixture may be joined in the incorporated mixture.

The method preferably comprises subjecting the deagglomerated mixture to a final smearing action between relatively moving hammer and anvil components after the addition to the deagglomerated mixture of final additives.

The deagglomerated mixture may be pelletised to produce feedstock. Alternatively the deagglomerated mixture may be passed to calendaring mills and subsequently to apparatus for the extrusion and vulcanisation of polymeric articles.

Apparatus for use in the method of the present invention preferably comprises an incorporating screw having a feed hopper in the region of one end and in the region of its other end an incorporating shear and smear assembly comprising an array of shear and smear tools arranged in the path of the material passing along the screw barrel, the screw having a milling tool component adjacent said tools and the arrangement being such that the admixture is smeared between adjacent surfaces of the milling tool and of the tools which move relative to one another in a direction transverse to the direction of flow of the mixture along the screw barrel.

The milling tool preferably has teeth projecting in circumferentially spaced relation from the screw shaft to define therebetween parallel channels which are oblique with respect to the axis of the shaft, said teeth each having at its downstream end major and minor end faces which form an obtuse angle with one another and acute angles with a plane to which the axis of the shaft is perpendicular, each said tool being generally of rectangular cross section to present a corner toward the major end surfaces of the teeth as the latter approach the tool, the arrangement being such that the admixture is smeared in the progressively reducing gap between a tool corner and a major filing tool end surface approaching the same as the milling tool rotates with the screw shaft.

A second, similar milling tool assembly may be provided rotating with the screw shaft on the opposite side of the tool array to the first-mentioned milling tool assembly.

A deagglomeration screw may be arranged across the output end of the incorporating screw to accept the smeared mixture produced by the latter, the deagglomeration screw having at a position spaced downstream from the junction with the incorporation screw a deagglomerating shear and smear assembly comprising hammer and anvil components similar to those of the incorporating shear and smear assembly.

The same deagglomeration screw may be arranged across the output ends of two similar incorporation screws, all of said screws having barrels of similar diameters and drive means for the screws may be arranged such that the deagglomeration screw rotates at half the speed of each incorporation screw.

The deagglomeration screw shear and smear assembly may comprise two arrays of said tools separated by a double-ended filing tool component.

A final shear and smear assembly may be arranged downstream of the deagglomeration shear and smear assembly and an injector for final additives may be disposed between the deagglomeration shear and smear assembly and the final shear and smear assembly.

BRIEF DESCRIPTION OF THE DRAWINGS

A preferred embodiment of the invention will new be described by way of example with reference to the accompanying Drawings, in which.

DESCRIPTION OF THE PREFERRED EMBODIMENT

Figure 1:
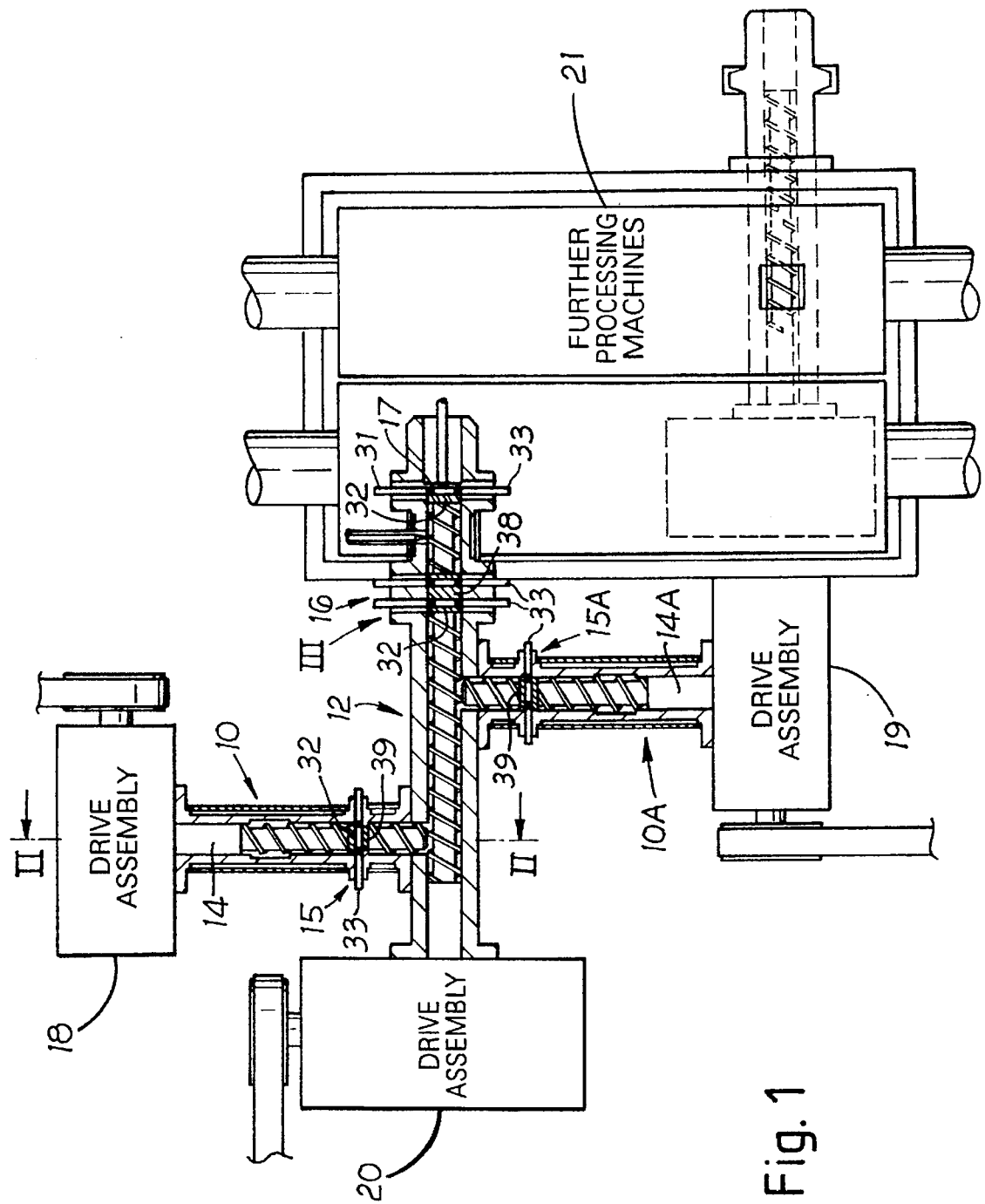
FIG. 1 is a plan view, partly in section, of apparatus for carrying out the method of the present invention.
Figure 2:
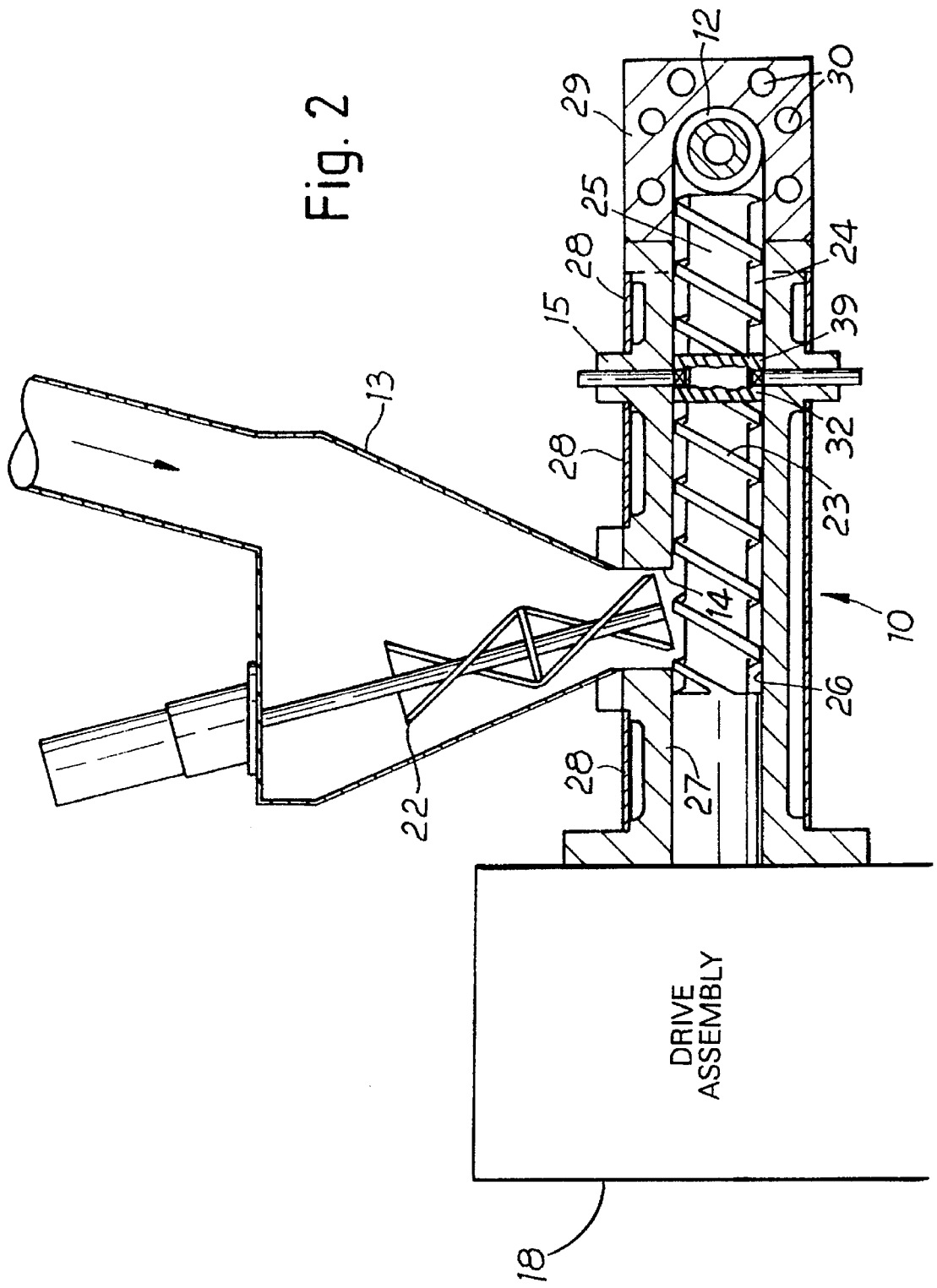
FIG. 2 is a sectional elevation taken on the line II—II of FIG. 1.

The apparatus illustrated in FIG. 1 comprises two similar incorporation screws 10 and 10A feeding at right-angles into a deagglomeration screw 12. The incorporation screw assemblies 10 and 10A have respective feed hoppers above openings 14 and 14A at positions remote from the deagglomeration screw 12. The feed hopper of the screw 10 is shown at 13 in FIG. 2 and it will be understood that the incorporation screw 10A has a similar feed hopper above its opening 14A.

Figure 3:
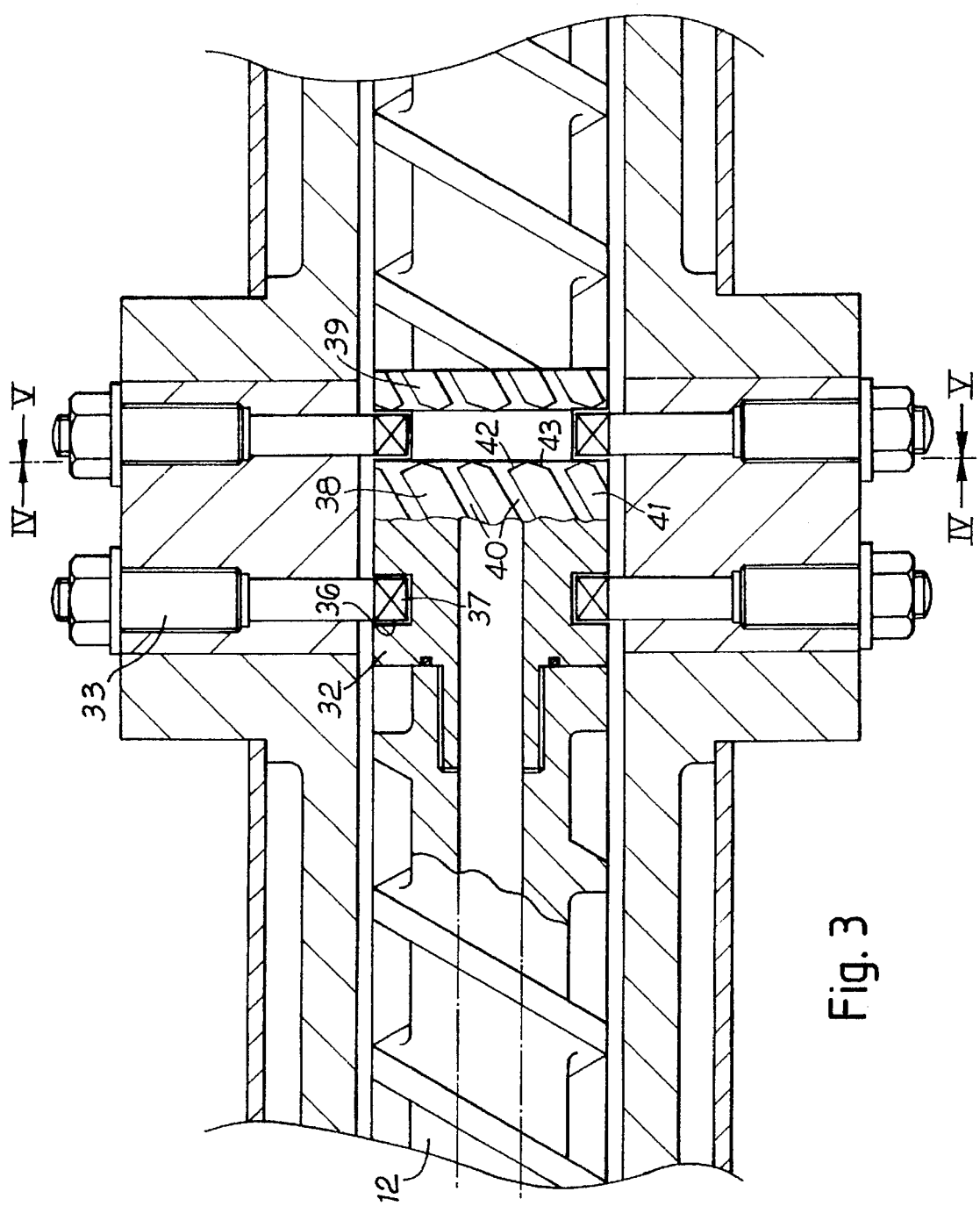
FIG. 3 shows the area III of the equipment of FIG. 1 on a larger scale and with parts cut away.
Figure 4:
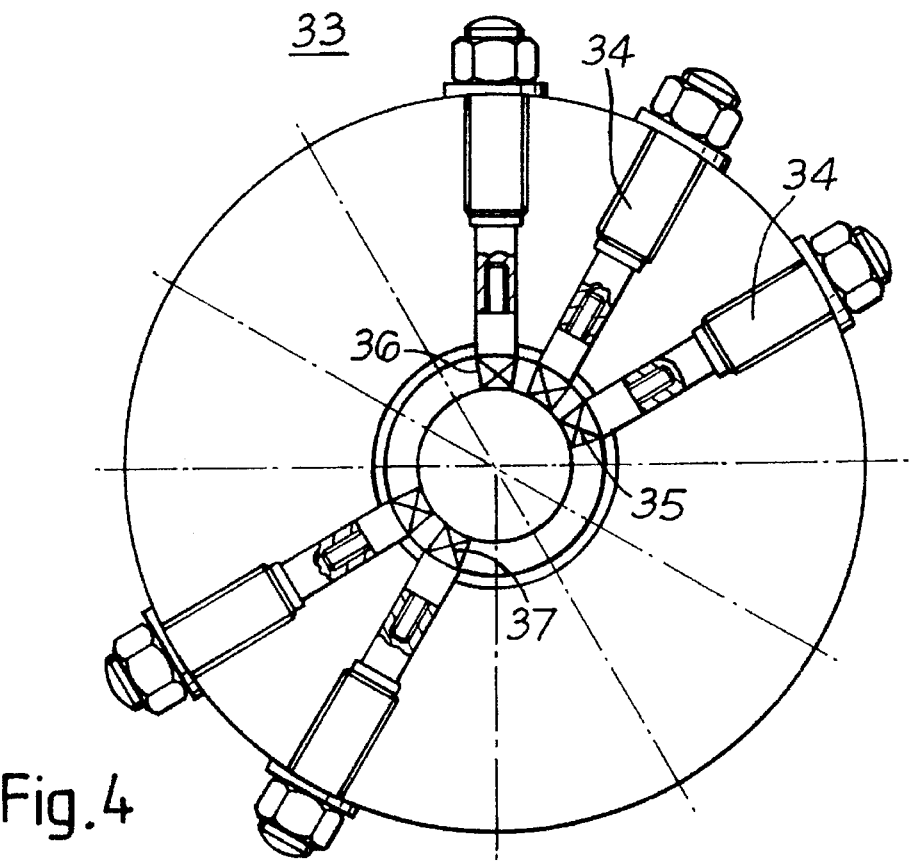
FIG. 4 is a view taken on the line IV—IV of FIG. 3.
Figure 5:
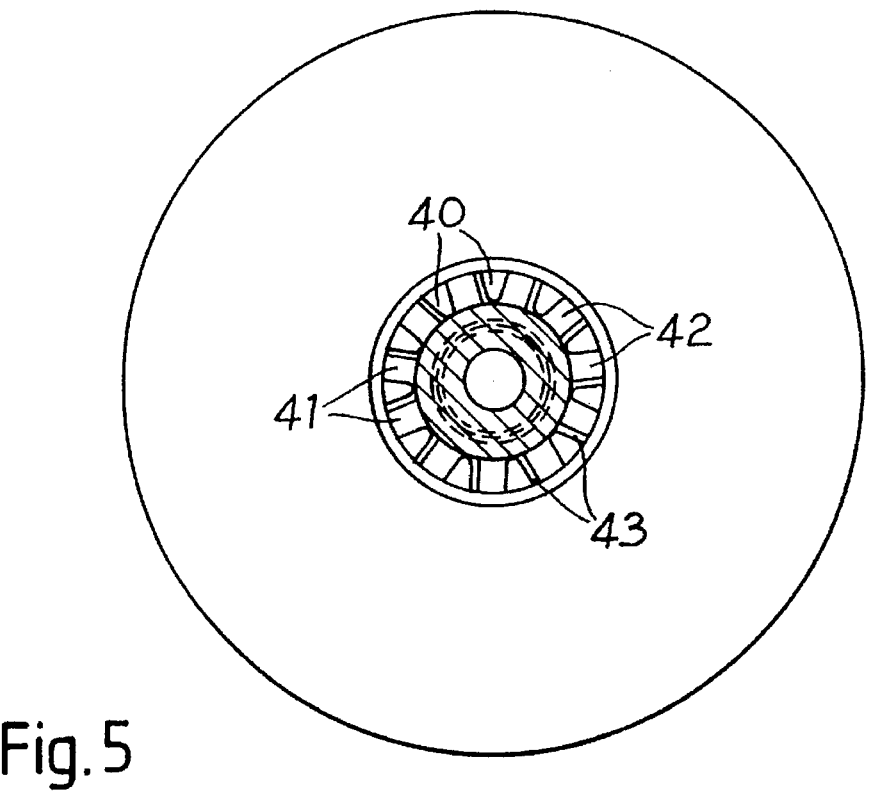
FIG. 5 is a view taken on the line V—V of FIG. 3.

At positions nearer to the deagglomeration screw 12 each incorporation screw assembly 10 and 10A has a respective shear-and-shear assembly 15 and 15A. Toward its downstream end the deagglomeration screw 12 has first a double shear-and-smear assembly 16 and then a final, half shear-and-smear assembly 17. Each of these shear-and-smear assemblies 15, 15A, 16 and 17 is made up of similar hammer and anvil components, those of the assembly 16 being most clearly illustrated in FIGS. 3, 4 and 5.

Each of the screws 10, 10A and 12 has a respective drive assembly 18, 19, 20 at its upstream end. At its downstream end the deagglomeration screw 12 discharges to machines 21 for the further processing of the mixture such as calendaring mills and extruders. Alternatively the product of the deagglomeration screw 12 may be pelletised to produce a feedstock for a conventional mixer such as a Banbury.

A loose admixture of "raw" (i.e. not previously subjected to working such as mastication) unvulcanised polymer pellets and carbon black primary aggregate in approximately equal proportions by weight is introduced into the feed hopper 13. A rotating feeder 22 assists gravity in passing the admixture through opening 14 to the screw 10. The constant pitch of the flight 23 of screw 10 and the constant dimensions of the space 24 between the shaft 25 of the screw and the internal bore 26 of the housing 27 of the screw are designed to ensure that the admixture is only lightly compacted and compressed while transported by the screw and consequently that at least upstream of the shear-and-smear assembly 15 the temperature of the admixture does not rise much above ambience. This can be further ensured by the passage of cooling water through jackets 28 surrounding the screw housing 27. The housing 29 of the deagglomeration screw 12 may similarly be provided with longitudinal bores 30 for the passage of cooling water.

After passage through the shear-and-smear assemblies 15 and 15A the mixtures output from the screws 10 and 10A are taken up by the deagglomeration screw 12 and passed through the double shear-and-smear assembly 16. Oils, tars and waxes are injected at 31 and thereafter the mixture is subjected to the final, half shear-and-smear assembly 17 before exiting from the screw 12.

The process of incorporation carried out by the screws 10 and 10A occurs at half the speed of the process of deagglomeration carried out by the screw 12. This is why the single deagglomeration screw 12 is fed by two, similar incorporation screws 10 and 10A. The screws 10 and 10A are rotated by their transmissions 18 and 19 at the same speed which is half that at which the screw 12 is rotated by its transmission 20.

As previously indicated all of the shear-and-smear assemblies 15, 15A, 16 and 17 are made up of similar components. Only the shear-and-smear assembly 16 is illustrated and will be described in detail but it will be understood that the others have the same features. Essentially each shear-and-smear assembly comprises an upstream milling tool 32, acting as an anvil, rotating adjacent an array of circumferentially spaced pegs 33, each acting as a hammer. All the pegs 34 of each array 33 thereof are in the same plane to which the axis of the associated screw is perpendicular. The inner, working end 35 of each peg 34 has a slight taper in longitudinal section but is rectangular in cross section so as to present a corner to the adjacent, relatively rotating milling tool 32 or milling tools between a flat face 36 presented to the milling tool and a flat face 37 opposed to the mixture extruded by or entering the milling tool.

The double deagglomeration screw 12 comprises a first, upstream milling tool 32, an intermediate, double-ended milling tool 38 and a downstream milling tool 39. Each milling tool face presented to an array 33 of pegs is similar and the following description of the milling tools 38 and 39 of the deagglomeration screw 12 applies equally to all other milling tools 32. Each milling tool such as 38 is a portion of the associated screw in which the flight is replaced by channels 40 which separate cog-like teeth 41 extending from and rotating with the shaft of the screw. The teeth 41 are shaped so that the channels 40, which are mutually parallel, lie at an acute angle to planes containing the axis of the shaft. At its end nearer the associated array 33 of pegs each tooth 41 has a major oblique face 42 and a minor oblique face 43, these oblique faces making acute angles with a plane to which the axis of the screw shaft is perpendicular. In the sense of rotation of the screw the major oblique face 42 of each tooth 41 is the leading one and the minor face 43 the trailing one. Thus material emerging from each channel 40 is smeared between a major oblique face 42 of a tooth 41 serving as an anvil and the corner, serving as a hammer, between faces 35 and 36 of the peg 33 which next encounters the mixture as the milling tool rotates. The smeared material then passes between the pegs. In all cases except the half shear-and-smear assembly 17 the material then encounters either a downstream milling tool 39 or, in the case of the shear-and-ear assembly 16, first a double-ended intermediate milling tool 38 followed by a second array 33 of pegs. Material passing downstream from a peg array 33 to an intermediate or downstream milling tool 38 or 39 is subjected to the same smearing action between major, oblique faces of the milling tool and corners of the pegs as when passing from a milling tool to the pegs, i.e. the peg corners, acting as "hammers" smear the mixture against the major oblique faces representing "hammers".

It will be appreciated that any chosen combination of milling tools and peg arrays can be disposed wherever desired along the length of each screw 10, 10A and 12. The combinations illustrated are intended to achieve the necessary incorporation and deagglomeration without subjecting the mixture to working such as to raise its temperature unacceptably. It is found that while passing through the incorporating shear-and-smear assemblies 15 and 15A the mixture reaches a maximum temperature of around 40 degrees centigrade. While passing through the shear-and-smear assemblies 16 and 17 of the deagglomeration screw 12 the temperature of the mixture may rise to 60 to 70 degrees centigrade, but this is acceptable for the already incorporated mixture and is still well below the temperature at which the polymer would plasticise or suffer heat degradation.

During passage through the initial, incorporating shear-and-smear assemblies 15 and 15A of the incorporating screws 10 and 10A the structure of fused groupings of carbon black particles is to some extent broken down but remains largely intact while the smearing action results in the penetration of the polymer into the voids of the remaining fused groupings of carbon black particles. In the mixture on the downstream side of each shear-and-smear assembly 15 and 15A there is very little free, unincorporated carbon black but the distribution of the carbon black throughout the polymer body, particularly free carbon black particles in the form of dust, is not yet sufficiently even or uniform. The action of the deagglomeration screw 12 is analogous to blending in that the further shearing and smearing of the incorporated mixture causes some further reduction of the carbon black structure but again without destroying it. More importantly carbon black dust is uniformly distributed throughout the mixture to avoid weak spots.

It will be evident that the arrangements of milling tools and pegs forming each shear-and-smear assembly may be varied considerably while fulfilling the same purpose. Individual pegs 34 are preferred because they can be individually removed for cleaning and refurbishment, but it is clear that fixed stops on the interior of the bore of the associated screw would equally serve. Alternatively each array 33 of pegs may be replaced by a "hammer" assembly rotating adjacent an "anvil" milling tool assembly which does not rotate with the shaft of the screw but is stationary in the screw housing. For shearing and smearing the mixture at the locations indicated, or any other chosen locations, any tool may be employed which presents a blunt working face transverse to the direction of flow of the mixture through the screw in combination with an adjacent "anvil" face, the "hammer" and "anvil" faces relatively moving in a direction transverse to the direction of flow of the admixture or mixture and being designed to achieve the desired smearing (as opposed to cutting) action.

We claim:

1. Method for incorporating a primary aggregate of carbon black into a polymeric material, comprising:

subjecting a loose, previously unworked dry mixture of the carbon black and said polymeric material to a shearing and smearing action between a plurality of combinations of relatively moving blunt hammer and anvil components, said relatively moving blunt hammer components comprising a stationary member and each of said anvil components comprising a milling tool, said subjecting step including:

an incorporating procedure in which a flow of the mixture is produced along an incorporating screw, and the mixture is sheared and smeared between end faces of selected ones of said milling tools rotating with a shaft of said incorporating screw and selected ones of said stationary members, said stationary members being arranged adjacent to said end faces in a circumferentially spaced array around said incorporating screw shaft, to thereby produce an incorporated, smeared mixture, and a deagglomerating procedure wherein the incorporated, smeared mixture is further subjected to a deagglomerating shearing and smearing action between selected relatively moving blunt hammer and anvil components, in which a flow of the incorporated, smeared mixture is caused to flow between a surface of each of said selected anvil components mounted oblique to a direction of flow of the mixture and each of said selected relatively moving blunt hammer components mounted transversely relative to the direction of flow and in proximity to a corresponding anvil surface, such that the incorporated, smeared mixture is smeared between said surface of each of said selected anvil components and each of said selected blunt hammer components, to thereby form a deagglomerated mixture; and maintaining, during said subjecting step, the polymeric material below a temperature at which said polymeric material plasticizes.

2. The method claimed in claim 1, wherein a flow rate during the incorporating procedure is half of a flow rate during the deagglomeration procedure.

3. The method claimed in claim 2, wherein two flows of the incorporated mixture are joined in the deagglomerated mixture.

4. The method claimed in claim 3, wherein final additives are added to said deagglomerated mixture, which is thereafter subjected to a final shearing and smearing action between selected relatively moving hammer and anvil components.

5. The method claimed in claim 4, wherein said deagglomerated mixture, after having been subjected to said final shearing and smearing action, is pelletized to produce feedstock.

6. The method claimed in claim 4, wherein said deagglomerated mixture, after having been subjected to said final shearing and smearing action, is passed to at least one calendaring mill, and subsequently to at least one extrusion and vulcanization apparatus.

7. Apparatus for the incorporation of a primary aggregate of carbon black into a polymeric material, comprising:

a first incorporating screw having a first and second end;

a feed hopper at said first end of said first incorporating screw; and an incorporating shear and smear assembly at said second end of said first incorporating screw, comprising a first array of incorporation shear and smear tools arranged along a path of a first internal bore which houses said first incorporating screw, the first incorporating screw comprising a first milling tool component adjacent said incorporation shear and smear tools, a mixture of said carbon black and said polymeric material being smeared between adjacent surfaces of said first milling tool and of said incorporation shear and smear tools which move relative to one another in a direction transverse to a direction of flow along said first internal bore, said first milling tool comprising teeth projecting in circumferentially spaced relation from a shaft of said first incorporating screw to define therebetween parallel channels which are oblique with respect to an axis of said shaft, said teeth each having, at a downstream end, major and minor end faces which form an obtuse angle with one another and acute angles with a plane to which said shaft is perpendicular, each of said incorporation shear and smear tools being generally of rectangular cross section to present a corner toward the major end faces of the teeth, as the teeth approach the incorporation shear and smear tools, such that said mixture is smeared in a progressively narrowing gap between said corner and said major end faces of the teeth as said corner approaches said major end faces when said milling tool rotates along with said shaft.

8. Apparatus as claimed in claim 7, further comprising a second milling tool structured as said first milling tool, said second milling tool rotating along with said shaft on a side of said first array opposite to a side of said first array of shear and smear tools on which said first milling tools are mounted.

9. Apparatus as claimed in claim 8, further comprising a deagglomeration screw arranged across an output end of said first incorporating screw, to accept a smeared mixture produced by said first incorporating screw, said deagglomeration screw having, at a position downstream from a junction with said first incorporating screw, a plurality of deagglomerating shear and smear tools, each structured as said incorporation shear and smear tools.

10. Apparatus according to claim 9, further comprising:

a second incorporating screw arranged in a second internal bore of substantially a same diameter as said first internal bore, said second incorporating screw feeding, at an output ends, into said deagglomeration screw;

a second array of incorporation shear and smear tools structured and arranged on said second incorporating screw as said first incorporation shear and smear tools are structured and arranged on said first incorporating screw; and drive means driving said first and second incorporating screws to rotate at half a speed of said deagglomeration screw.

11. Apparatus according to claim 9, wherein said deagglomerating shear and smear tools comprise two arrays of shear and smear tools separated by a double ended milling tool component.

12. Apparatus according to claim 11, further comprising:

a final shear and smear assembly arranged downstream from said plurality of deagglomeration shear and smear tools; and an injector for injecting final additives, disposed between said plurality of shear and smear tools and said final shear and smear assembly.

\* \* \* \* \*